(12) United States Patent
Li et al.

(10) Patent No.: US 12,462,008 B2
(45) Date of Patent: Nov. 4, 2025

(54) UNLOCKING CONTROL METHOD AND DEVICE, ELECTRONIC APPARATUS, AND COMPUTER-READABLE STORAGE MEDIUM

(71) Applicants: Beijing BOE Technology Development Co., Ltd., Beijing (CN); BOE Technology Group Co., Ltd., Beijing (CN)

(72) Inventors: Wenbo Li, Beijing (CN); Jindou Liu, Beijing (CN); Yanzhao Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/639,261

(22) PCT Filed: Apr. 23, 2021

(86) PCT No.: PCT/CN2021/089148
§ 371 (c)(1),
(2) Date: Oct. 27, 2022

(87) PCT Pub. No.: WO2022/222125
PCT Pub. Date: Oct. 27, 2022

(65) Prior Publication Data
US 2024/0045940 A1 Feb. 8, 2024

(51) Int. Cl.
*G06F 21/36* (2013.01)
*G06F 3/01* (2006.01)
(Continued)

(52) U.S. Cl.
CPC .............. *G06F 21/36* (2013.01); *G06F 3/016* (2013.01); *G06F 3/04845* (2013.01);
(Continued)

(58) Field of Classification Search
CPC ...... G06F 21/36; G06F 3/016; G06F 3/04845; G06F 3/0488; G06F 3/04883; G06F 2221/2149; G06F 3/0484
See application file for complete search history.

(56) References Cited

U.S. PATENT DOCUMENTS

2019/0080119 A1* 3/2019 Wang ..................... G06V 10/96

FOREIGN PATENT DOCUMENTS

| CN | 105095708 A | 11/2015 |
| CN | 105589654 A | 5/2016 |

(Continued)

*Primary Examiner* — Cao H Nguyen
(74) *Attorney, Agent, or Firm* — IPro, PLLC (57) ABSTRACT

The present disclosure provides an unlocking control method, an unlocking control device, an electronic apparatus, and a computer-readable storage medium. The unlocking control method for the electronic apparatus includes: obtaining an unlocking touch input; in the case that a retention time of the unlocking touch input at any one of a plurality of target positions is greater than a predetermined time threshold, generating at least one vibration excitation in accordance with the retention time; and in the case that an unlocking control signal determined in accordance with the unlocking touch input matches a predetermined unlocking password, controlling the electronic apparatus to be unlocked. The unlocking control signal includes a touch sequence of the unlocking touch input with respect to the plurality of target positions and the quantity of vibration excitations generated at each target position.

9 Claims, 5 Drawing Sheets

(51) Int. Cl.
  *G06F 3/04845*   (2022.01)
  *G06F 3/0488*   (2022.01)
  *G06F 3/04883*   (2022.01)

(52) U.S. Cl.
  CPC ........ *G06F 3/0488* (2013.01); *G06F 3/04883* (2013.01); *G06F 2221/2149* (2013.01)

(56)     References Cited

FOREIGN PATENT DOCUMENTS

| | | | | |
|---|---|---|---|---|
| CN | 105808088 A | * | 7/2016 | |
| CN | 110222490 A | | 9/2019 | |
| CN | 111538408 A | * | 8/2020 | ............. G06F 3/016 |

* cited by examiner

UNLOCKING CONTROL METHOD AND DEVICE, ELECTRONIC APPARATUS, AND COMPUTER-READABLE STORAGE MEDIUM

CROSS-REFERENCE TO RELATED APPLICATION

This application is the U.S. national phase of PCT application No. PCT/CN2021/089148 filed on Apr. 23, 2021, the entire contents of which are incorporated herein by reference.

TECHNICAL FIELD

The present disclosure relates to the field of human-computer interaction technology, in particularly to an unlocking control method, an unlocking control device, an electronic apparatus, and a computer-readable storage medium.

BACKGROUND

In order to avoid misoperation in the process of using an electronic apparatus such as a mobile phone, it is usually necessary to lock the electronic apparatus when it is not in use. In the related art, a sliding operation is performed on a screen of the electronic apparatus so as to unlock the electronic apparatus.

SUMMARY

In one aspect, the present disclosure provides in some embodiments an unlocking control method for an electronic apparatus, including: obtaining an unlocking touch input; in the case that a retention time of the unlocking touch input at any one of a plurality of target positions is greater than a predetermined time threshold, generating at least one vibration excitation in accordance with the retention time; and in the case that an unlocking control signal determined in accordance with the unlocking touch input matches a predetermined unlocking password, controlling the electronic apparatus to be unlocked. The unlocking control signal includes a touch sequence of the unlocking touch input with respect to the plurality of target positions and the quantity of vibration excitations generated at each target position.

In a possible embodiment of the present disclosure, the electronic apparatus includes a plurality of piezoelectric assemblies, and the generating at least one vibration excitation in accordance with the retention time includes driving at least one of the plurality of piezoelectric assemblies to generate the at least one vibration excitation.

In a possible embodiment of the present disclosure, the electronic apparatus includes a touch region. Subsequent to obtaining the unlocking touch input, the unlocking control method further includes: obtaining a distance between a touch point of the unlocking touch input and each target position; in the case that the distance between the touch point and each target position is greater than a first distance threshold, driving the touch region to vibrate in a first mode; in the case that the distance between the touch point and at least one of the target positions is less than or equal to the first distance threshold and the distance between the touch point and any of the target positions is greater than a second distance threshold, driving the touch region to vibrate in a second mode; and in the case that there is a target position whose distance from the touch point is less than or equal to the second distance threshold, driving the touch region to vibrate in a third mode. The first distance threshold is greater than the second distance threshold, and the first mode, the second mode, and the third mode are different from each other.

In a possible embodiment of the present disclosure, the electronic apparatus includes a plurality of piezoelectric assemblies surrounding the touch region, and subsequent to obtaining the unlocking touch input, the unlocking control method further includes: obtaining a touch movement direction corresponding to the unlocking touch input; and determining a target piezoelectric assembly that drives the touch region to vibrate in accordance with the touch movement direction. A distance between the target piezoelectric assembly and a straight line where the touch movement direction is arranged is less than a fourth distance threshold.

In a possible embodiment of the present disclosure, the driving the touch region to vibrate in the first mode includes driving the touch region to vibrate through the piezoelectric assembly with a first carrier signal carrying a first modulation signal; and/or the driving the touch region to vibrate in the second mode includes driving the touch region to vibrate through the piezoelectric assembly with the first carrier signal.

In a possible embodiment of the present disclosure, the electronic apparatus further includes a linear motor, and the driving the touch region to vibrate in the third mode includes driving the touch region to vibrate through the linear motor with a second carrier signal. A frequency of the second carrier signal is less than a frequency of the first carrier signal.

In a possible embodiment of the present disclosure, the driving the touch region to vibrate in the third mode further includes driving the touch region to vibrate through the piezoelectric assembly with a first carrier signal carrying a second modulation signal. The second modulation signal is different from the first modulation signal.

In a possible embodiment of the present disclosure, the second modulation signal is a square wave signal.

In another aspect, the present disclosure provides in some embodiments an unlocking control device for an electronic apparatus, including: an obtaining module configured to obtain an unlocking touch input; an excitation module configured to, in the case that a retention time of the unlocking touch input at any one of a plurality of target positions is greater than a predetermined time threshold, generate at least one vibration excitation in accordance with the retention time; and an unlocking module configured to, in the case that an unlocking control signal determined in accordance with the unlocking touch input matches a predetermined unlocking password, control the electronic apparatus to be unlocked. The unlocking control signal includes a touch sequence of the unlocking touch input with respect to the plurality of target positions and the quantity of vibration excitations generated at each target position.

In yet another aspect, the present disclosure provides in some embodiments an electronic apparatus, including a processor, a memory, and a computer program stored in the memory and executed by the processor. The computer program is executed by the processor so as to implement the steps in the above-mentioned unlocking control method.

In still yet another aspect, the present disclosure provides in some embodiments a computer-readable storage medium storing therein a computer program. The computer program is executed by a processor so as to implement the steps in the above-mentioned unlocking control method.

According to the embodiments of the present disclosure, the vibration excitation is generated in accordance with the retention time of an unlocking touch operation at the target position, and the determined unlocking control signal includes a sliding track of the touch operation and a touch time at a designated position. As a result, it is impossible to directly unlock the electronic apparatus even if a path in the unlocking touch operation has been observed, so it is able to improve the safety.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The technical solutions in the embodiments of the present disclosure may be used to unlock an electronic apparatus, such as a mobile phone, a tablet computer, an e-book reader, an electronic computer or a wearable device. When some electronic apparatuses are not in use, they are controlled to be in a locked state so as to prevent the electronic apparatuses from being touched by mistake or to prevent other unauthorized users from using the electronic apparatuses. In addition, in order to protect the privacy of contents in the electronic apparatus, specific data or applications may be locked and encrypted.

In an existing unlocking method, the electronic apparatus is unlocked through an unlocking gesture of sliding over designated nodes.

Figure 1:
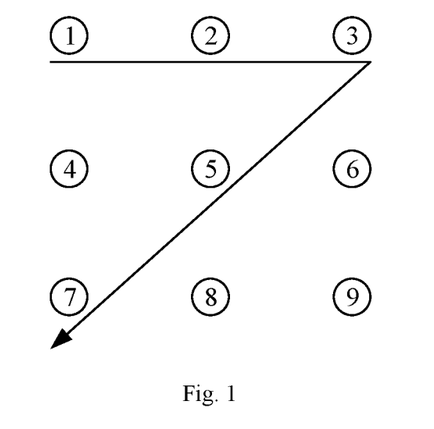
FIG. 1 is schematic view showing an unlocking interface for a conventional electronic apparatus.

As shown in FIG. 1, an existing unlocking interface includes nine nodes arranged in an array form, and a user needs to slide over some or all of the nodes in a certain order to unlock the electronic apparatus in the case that the order of sliding over the nodes is the same as a predetermined password. In FIG. 1, an unlocking password is 12357, that is, the user may unlock the electronic apparatus through sliding along the path indicated by an arrow in FIG. 1. However, an unlocking gesture of sliding over the nodes may be observed by other users to unlock the electronic apparatus, so an unlocking mode of the electronic apparatus is probably leaked to the other users.

The present disclosure provides in some embodiments an unlocking control method which is applied to an electronic apparatus.

Figure 2:
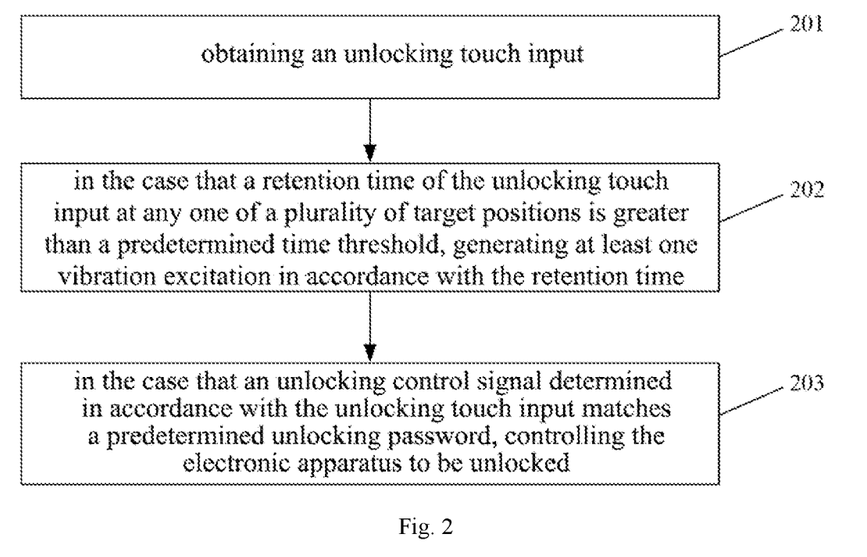
FIG. 2 is a flow chart of an unlocking control method according to one embodiment of the present disclosure.

As shown in FIG. 2, in a possible embodiment of the present disclosure, the unlocking control method includes the following steps.

Step 201: obtaining an unlocking touch input.

In the embodiments of the present disclosure, the unlocking touch input is an unlocking signal inputted by a user on the electronic apparatus through a finger, or a stylus. In the embodiments of the present disclosure, the description is given by taking a gesture unlocking signal inputted by the user on the mobile phone through a finger as an example. During the implementation, a time when the user's finger touches a touch region is taken as a starting time of the unlocking touch input, and when the user's finger is separated from the touch region, it is considered that the user has completed an input operation for the unlocking touch input.

Step 202: in the case that a retention time of the unlocking touch input at any one of a plurality of target positions is greater than a predetermined time threshold, generating at least one vibration excitation in accordance with the retention time.

In the embodiments of the present disclosure, the target position is a specific position in a path for an unlocking process.

For example, as shown in FIG. 1, in the unlocking interface, when the unlocking gesture needs to slide over nodes 1 to 9 to generate a corresponding unlocking gesture, these nodes are the target positions. In some other cases, when the unlocking gesture needs to slide over a region where a specific pattern of an image is located, each feature position on the pattern is the target position.

It should be appreciated that, in the embodiments of the present disclosure, the target positions includes not only positions corresponding to the unlocking password, but also any other positions having an input response. As shown in FIG. 1, the unlocking interface includes nodes 1 to 9, and the unlocking password does not include node 4, but the node 4 may be used to trigger an input of the unlocking gesture, so the node 4 is also defined as a target position.

When inputting the unlocking touch input, the node 1 is a target position to be slid over. When the user's finger slides to the node 1 and the retention time at the node 1 reaches the predetermined time threshold, the electronic apparatus generates corresponding vibration excitation, and the quantity of the vibration excitations is determined in accordance with a retention duration.

For example, in the embodiments of the present disclosure, the predetermined time threshold is set to be 0.5 second. When the user's finger stays at the node 1 for 0.5 second, a vibration excitation is generated, and next, the vibration excitation is generated each time the user's finger stays at the node 1 for 0.5 second. In this regard, the longer the retention time of the user's finger at the node 1, the more the generated vibration excitations.

The finger may move away from the node 1 when the user determines that the quantity of vibration excitations has reached a certain value.

An unlocking control signal includes a touch sequence of the unlocking touch input with respect to the plurality of target positions and the quantity of vibration excitations generated at each target position. It should be appreciated that, when the user's finger slides over a plurality of nodes in sequence and a certain quantity of vibration excitations are generated at each node, the sequence of sliding over the nodes and the quantity of vibration excitations generated at each node together form the unlocking control signal determined by the unlocking touch input.

When the retention time at node 1 is t, the time threshold is Tth and the quantity of vibration excitations is N, N=[t/Tth], [ ] represents a round down function.

Figure 3:
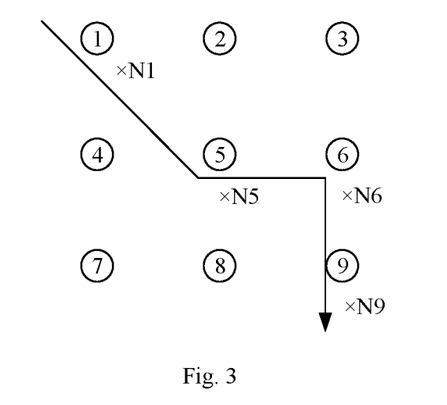
FIG. 3 is a schematic view showing a scenario where an unlocking control process is performed according to one embodiment of the present disclosure.

As shown in FIG. 3, the user's finger slides over four nodes 1, 5, 6 and 9 in sequence, and the quantity of vibration excitations generated at each node is N1, N5, N6, and N9, i.e., 1 (N1), 5 (N5), 6 (N6), 9 (N9) or (i, j)=(1, 5, 6, 9) (N1, N5, N6, N9). Obviously, a format of the unlocking control signal generated in accordance with the unlocking touch input is not limited thereto.

Step 203: in the case that the unlocking control signal determined by the unlocking touch input matches a predetermined unlocking password, controlling the electronic apparatus to be unlocked.

Subsequent to determining the unlocking control signal in accordance with the unlocking touch input, the unlocking control single is compared with the predetermined unlocking password, and when the unlocking control signal matches the predetermined unlocking password, the electronic apparatus is controlled to be unlocked.

In some embodiments of the present disclosure, when the user's finger slides over a certain node but no vibration excitation is generated, the quantity of vibration excitations at the node is recorded as 0. In the unlocking process, it is necessary to consider a relative order of the finger sliding over the node and other nodes.

In some other embodiments of the present disclosure, when the user's finger slides over a certain node but no vibration excitation is generated, the generated unlocking control signal does not include information about the node, that is, even when the finger slides over the node, the unlocking password will not be affected adversely as long as no vibration excitation is generated. In this regard, the unlocking gesture observed by the other users may include the node, but the actual unlocking password is irrelevant to the node, so it is able to further improve the security.

In some embodiments of the present disclosure, the predetermined time threshold corresponding to each node may be adjusted according to the practical need. For example, the predetermined time threshold corresponding to each node for generating the vibration excitation may be set as the same; or there may exist a fixed difference between the predetermined time thresholds corresponding to nodes for generating the vibration excitation; or the predetermined time threshold corresponding to each node for generating the vibration excitation may be randomly generated in each unlocking process. In this regard, even when the unlocking password is the same, the retention time at a same node may be different in two unlocking processes, and even when any other unauthorized user has known an unlocking mechanism in the embodiments of the present disclosure and has observed the user's unlocking gesture as well as the retention time at each node, it is still unable to directly obtain the unlocking password. As a result, it is able to further improve the security and reduce the possibility of password leakage.

According to the embodiments of the present disclosure, the vibration excitation is generated in accordance with the retention time of an unlocking touch operation at the target position, and the determined unlocking control signal includes a sliding track of the touch operation and a touch time at a designated position. As a result, it is impossible to directly unlock the electronic apparatus even if a path in the unlocking touch operation has been observed, so it is able to improve the safety.

In some embodiments of the present disclosure, the electronic apparatus includes a touch region. Subsequent to obtaining the unlocking touch input, the unlocking control method further includes: obtaining a distance between a touch point of the unlocking touch input and each target position; in the case that the distance between the touch point and each target position is greater than a first distance threshold, driving the touch region to vibrate in a first mode; in the case that the distance between the touch point and at least one of the target positions is less than or equal to the first distance threshold and the distance between the touch point and any of the target positions is greater than a second distance threshold, driving the touch region to vibrate in a second mode; and in the case that there is a target position whose distance from the touch point is less than or equal to the second distance threshold, driving the touch region to vibrate in a third mode. The first distance threshold is greater than the second distance threshold, and the first mode, the second mode, and the third mode are different from each other.

In the unlocking process, it is necessary to obtain the distance between the unlocking touch input of the user and each target position, so as to provide different touch feedbacks. In the embodiments of the present disclosure, to be specific, a distance between the user's finger and each node is obtained, and different touch body feelings are provided through the feedback of different vibration modes.

It should be further appreciated that, in the embodiments of the present disclosure, the "distance" is a minimum distance between two elements, such as vertical distance. In order to provide the touch feedback at each target position in a better manner, the first distance threshold is less than a half of the distance between two adjacent target positions, for example, the distance is measured in accordance with center points of the adjacent target positions.

In the embodiments of the present disclosure, the first distance threshold and the second distance threshold are set. When the distance between a touch point of the user's finger and each target position is large, or greater than the first distance threshold, the touch region is driven to vibrate in the first mode to provide the user's finger with a first body feeling, and the first body feeling is used to indicate that the user's finger is still far from the node. When the touch point of the user's finger is close to a certain target position, the touch region is driven to vibrate in the second mode to provide the user's finger with a second body feeling, and the second body feeling is used to indicate that the user's finger is gradually close to the node. When the distance between the touch point of the user's finger and a certain node is less than the second distance threshold, that is, the user's finger actually reaches the position where the node is located, the touch region is driven to vibrate in the third mode to provide the user's finger with a third body feeling, and the third body feeling is used to indicate that the user's finger is located at a position where the node is located. At this time, the user may determine whether to stay at the position, and when the user's finger stays at the position for the predetermined time threshold, the vibration excitation is further generated.

Figure 4:
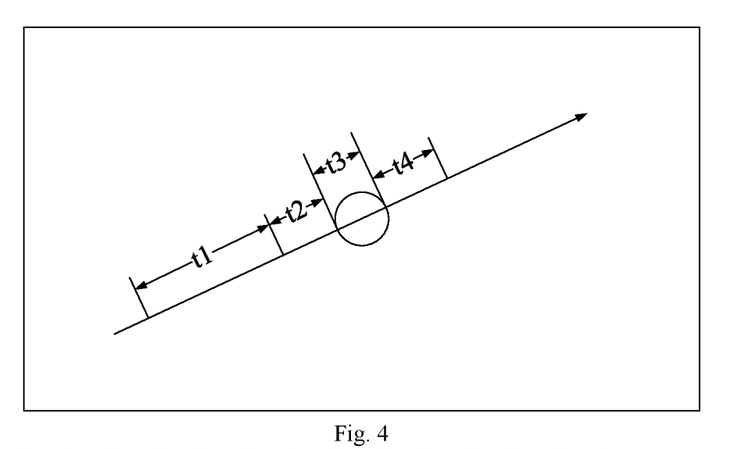
FIG. 4 is a schematic view showing a scenario where a sliding process is performed according to one embodiment of the present disclosure.

As shown in FIG. 4, a single arrow represents a sliding track of the finger, and a circle represents a region corresponding to one node. During the operation, in a time period t1 corresponding to situation where the user's finger is relatively far from the node, the first body feeling is provided in the first mode. In a time period t2 when the user's finger is gradually close to the node, the second body feeling is provided in the second mode. In a time period t3 when the user's finger slides over the node or stays at the node, the third body feeling is provided in the third mode. In a time period t4 when the user's finger gradually moves away from the node, the second body feeling is provided in the second mode, and so on.

In this regard, it is able to provide different body feeling signals to the user in accordance with a change in the position of the touch point of the user's finger, thereby to improve the user experience and help the user to determine the position of the node. Even if the position of the node is not effectively observed, it is able to determine the position of the node to some extent merely through tactile, thereby to improve the accuracy and convenience of the unlocking operation.

In the embodiments of the present disclosure, it is able to drive the touch region to vibrate through at least one of a piezoelectric assembly and a linear motor, thereby to provide the body feelings.

In a possible embodiment of the present disclosure, the electronic apparatus includes a plurality of piezoelectric assemblies surrounding the touch region. The touch region includes a touch display screen, or a touch region arranged separately, for example, a touchpad.

Figure 5:
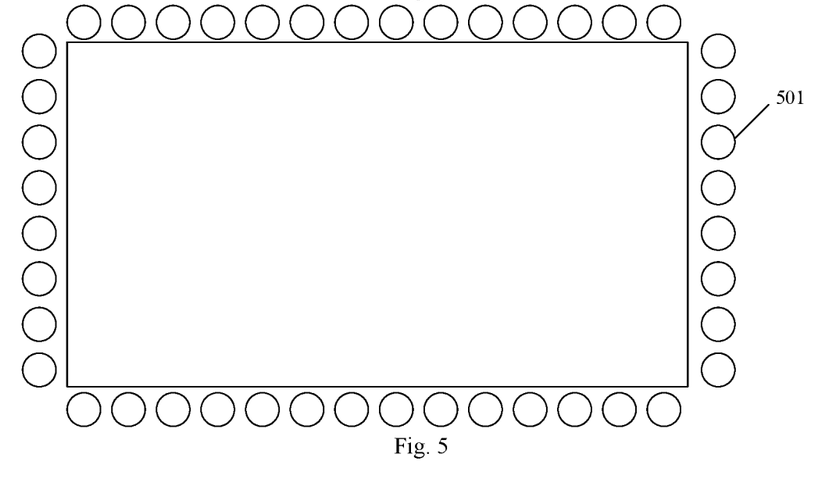
FIG. 5 is a schematic view showing an electronic apparatus according to one embodiment of the present disclosure.

As shown in FIG. 5, in a possible embodiment of the present disclosure, the plurality of piezoelectric assemblies 501 surrounds the touch region. It should be appreciated that, positions and shapes of the piezoelectric assemblies 501 are for illustrative purposes only, and an actual shape, a spacing, and a position of each piezoelectric assembly are not limited thereto.

The piezoelectric assembly may be an element having a piezoelectric effect such as piezoelectric ceramics. When a driving voltage is applied, the piezoelectric assembly may vibrate at a high frequency. When the vibration is transferred to the user's finger, as the body feeling of the finger, a friction force changes in the sliding process. In this way, it is able to provide the tactile in different ways.

Subsequent to obtaining the unlocking touch input, the unlocking control method further includes: obtaining a touch movement direction corresponding to the unlocking touch input; and determining a target piezoelectric assembly that drives the touch region to vibrate in accordance with the touch movement direction. A distance between the target piezoelectric assembly and a straight line where the touch movement direction is arranged is less than a fourth distance threshold.

In the embodiments of the present disclosure, the touch movement direction is determined through continuously detecting the touch positions, and then the touch movement direction is predicted in accordance with a detection result of the touch positions. For example, a coordinate system of the touch region is established, and a slope between two continuous touch points is calculated in accordance with coordinates of the two touch points, so as to determine the touch movement direction.

Figure 6:
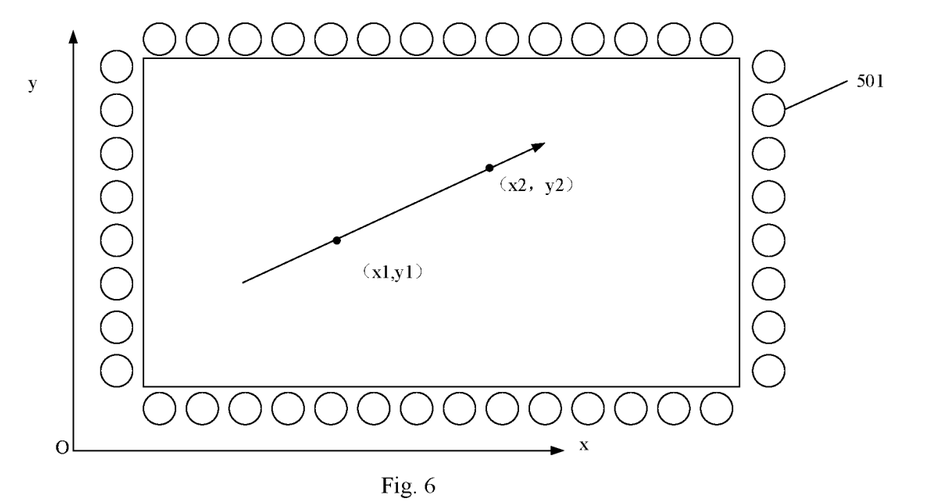
FIG. 6 is another schematic view showing the scenario where the sliding process is performed according to one embodiment of the present disclosure.

As shown in FIG. 6, a single arrow represents a sliding track of the finger in the touch region. For example, a plane rectangular coordinate system xoy is established in accordance with the touch region. At a first moment, coordinates of the touch point are (x1, y1), and at a second moment, coordinates of the touch point are (x2, y2). When x2 is equal to x1, the touch movement direction is a y-axis direction, when x2 is not equal to x1, a slope k of the touch movement direction is calculated through $k=(y2-y1)/(x2-x1)$, so as to determine the touch movement direction.

Subsequent to determining the touch movement direction, the target piezoelectric assembly for driving the touch region to vibrate is determined. In the embodiments of the present disclosure, the target piezoelectric assembly is a piezoelectric assembly to which the determined touch movement direction points. Because the piezoelectric assemblies surround the touch region, the target piezoelectric assembly is also understood as a piezoelectric assembly whose distance from the straight line where the touch movement direction is located is less than the fourth distance threshold. The fourth distance threshold is set in such a manner that there is at least one piezoelectric assembly in a region defined by two lines each spaced apart from the straight line of the touch movement direction by a distance smaller than the fourth distance threshold.

Piezoelectric assemblies each with a filling effect in FIG. 7 to FIG. 10 are the target piezoelectric assemblies. As shown in FIG. 7 to FIG. 10, a single arrow indicates a sliding track of the finger, a dotted line L1 overlapping the single arrow indicates the touch movement direction, L2 and L3 are straight lines arranged at two sides of L1 respectively and spaced apart from L1 by a distance equal to the fourth distance threshold. The piezoelectric assembly arranged within a region defined by L2 and L3 is the selected target piezoelectric assembly.

Figure 7:
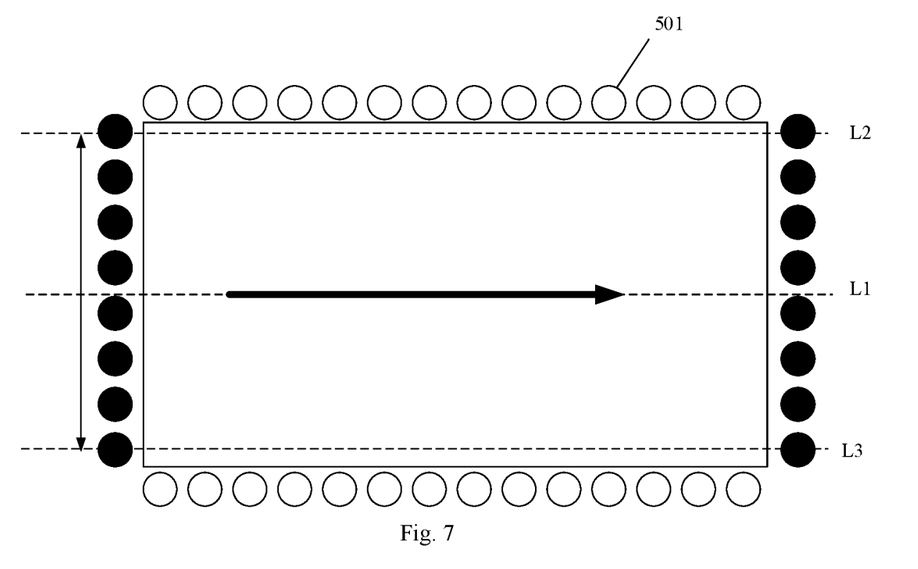
FIG. 7 is a schematic view showing the selection of a target piezoelectric assembly according to one embodiment of the present disclosure.
Figure 8:
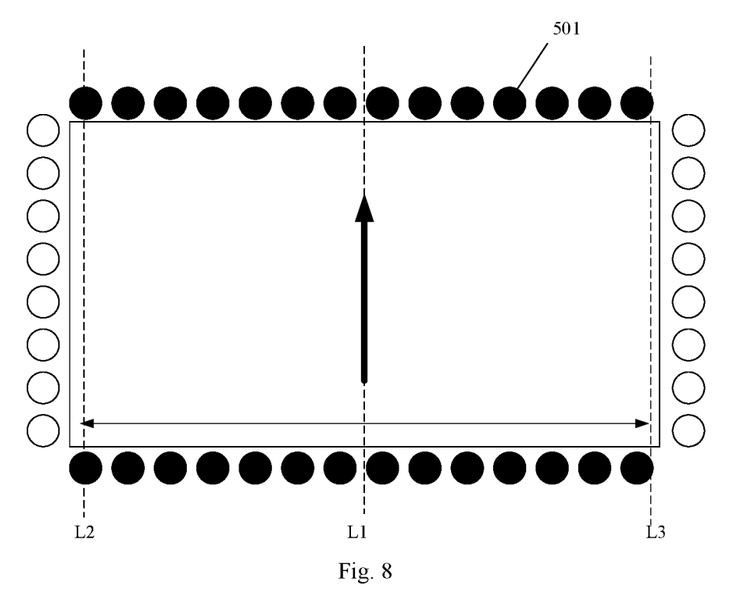
FIG. 8 is another schematic view showing the selection of the target piezoelectric assembly according to one embodiment of the present disclosure.
Figure 9:
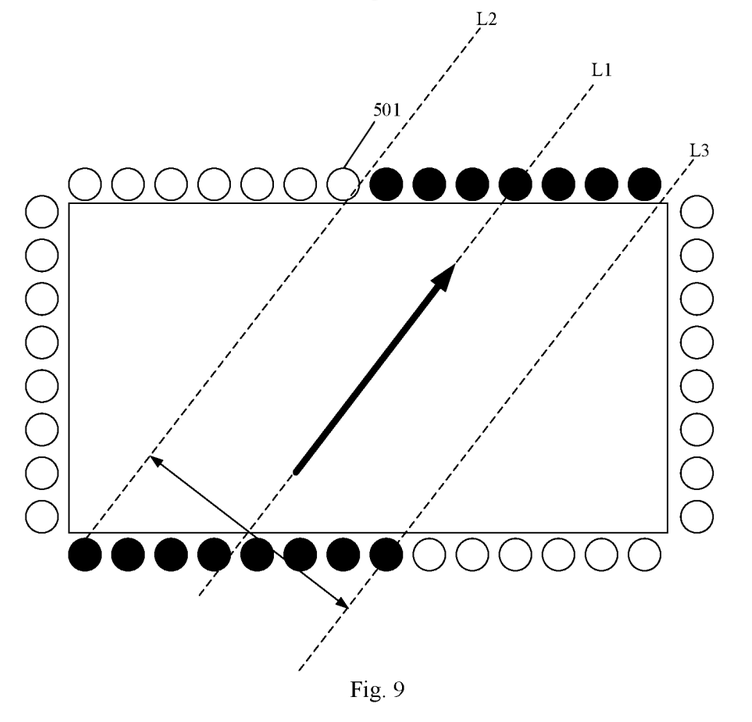
FIG. 9 is yet another schematic view showing the selection of the target piezoelectric assembly according to one embodiment of the present disclosure.
Figure 10:
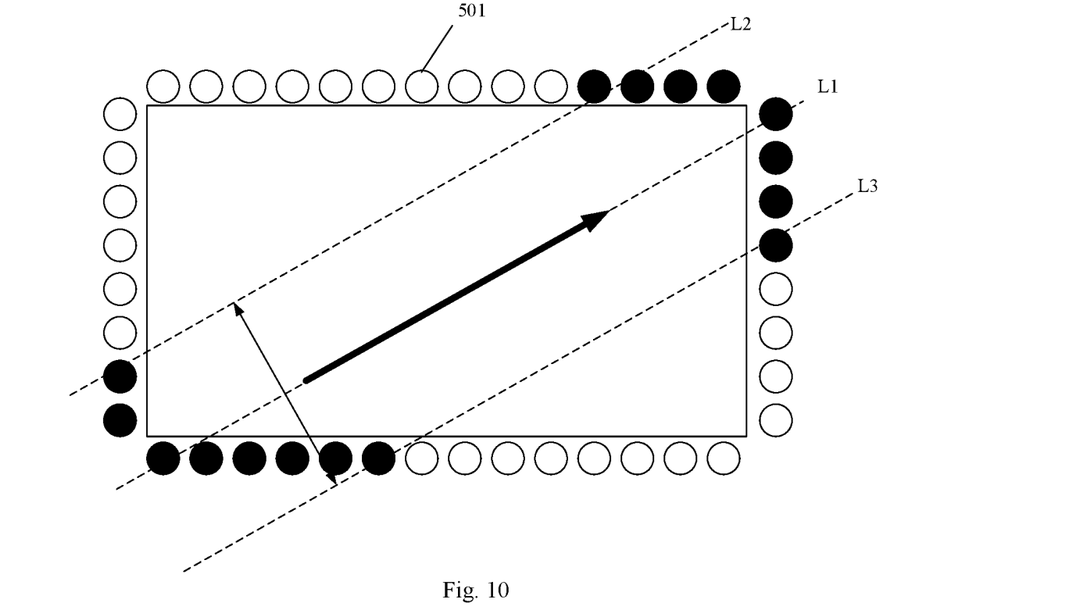
FIG. 10 is still yet another schematic view showing the selection of the target piezoelectric assembly according to one embodiment of the present disclosure.

As shown in FIG. 7, when the finger slides horizontally, the piezoelectric assemblies at left and right sides of a screen are the target piezoelectric assemblies. As shown in FIG. 8, when the finger slides vertically, the piezoelectric assemblies at upper and lower sides of the screen are the target piezoelectric assemblies. As shown in FIG. 9 and FIG. 10, when the finger slides obliquely, a corresponding target piezoelectric assembly is selected according to the practical need. As a result, it is able to improve a sliding touch feeding.

In some embodiments of the present disclosure, the driving the touch region to vibrate in the first mode includes driving the touch region to vibrate through the piezoelectric assembly with a first carrier signal carrying a first modulation signal; and/or the driving the touch region to vibrate in the second mode includes driving the touch region to vibrate through the piezoelectric assembly with the first carrier signal.

In the embodiments of the present disclosure, the first carrier signal is a carrier signal at a relatively high frequency. Generally speaking, the frequency is no less than 20 kilohertz (kHz). In a possible embodiment of the present disclosure, the first carrier signal is a signal at a frequency of 26.4 kHz. In this regard, under the effect of the first carrier signal carrying the first modulation signal, the first body feeling fed back to the user's finger is a relatively smooth feeling.

In the second mode, the carried information is removed, and the second body feeling fed back to the user's finger is the friction force of the touch region. In the transition from the first body feeling to the second body feeling, the user may feel an increase in the friction force, i.e., there is such a feeling of protrusions on the interface.

Figure 11:
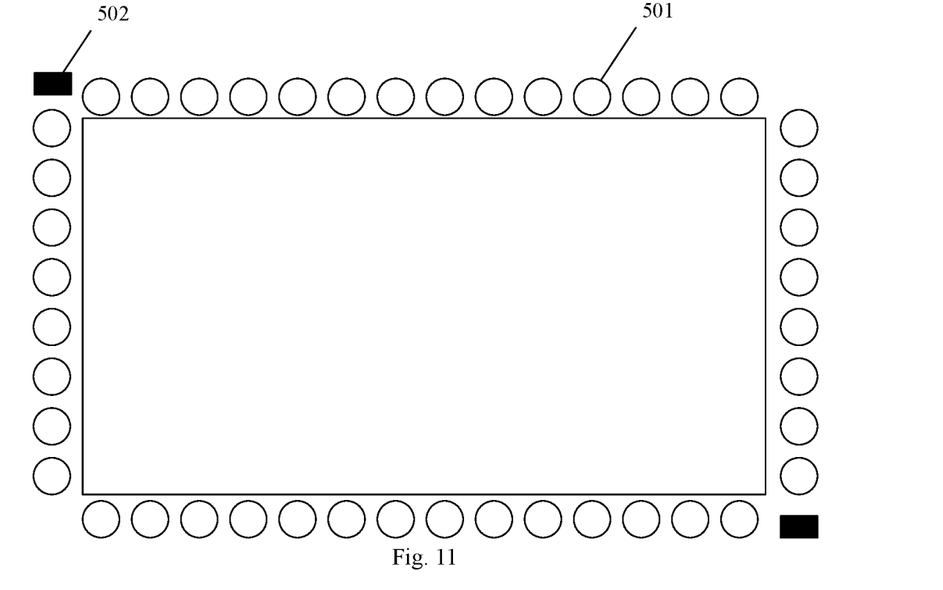
FIG. 11 is another schematic view showing the electronic apparatus according to one embodiment of the present disclosure.

In some embodiments of the present disclosure, as shown in FIG. 11, the electronic apparatus further includes a linear motor 502 arranged at an edge of the touch region or below the touch region, so as to improve a feedback effect about the vibration excitation. Obviously, the position of the linear motor is not limited thereto, and it may be adjusted according to the practical need.

The driving the touch region to vibrate in the third mode includes driving the touch region to vibrate through the linear motor with a second carrier signal. A frequency of the second carrier signal is less than a frequency of the first carrier signal.

In the embodiments of the present disclosure, the linear motor is driven by the second carrier signal at a relatively low frequency, so as to provide a relatively large amplitude, and simulate the pressure of a real button. After test, the amplitude of the vibration excitation is about 8 microns, so it is able for the user to feel the vibration excitation more accurately.

When the vibration excitation is fed back through the linear motor, the piezoelectric assembly may stop or continue to work.

In some embodiments of the present disclosure, the driving the touch region to vibrate in the third mode further includes driving the touch region to vibrate through the piezoelectric assembly with a first carrier signal carrying a second modulation signal. The second modulation signal is different from the first modulation signal.

In the embodiments of the present disclosure, tactile similar to the first body feeling and the second body feeling may also be fed back through the piezoelectric assembly. To be specific, the second modulation signal is further carried on basis of the first carrier signal to obtain a new driving waveform, so as to provide different body feelings to the user's finger. In some embodiments of the present disclosure, the second modulation signal is a square wave signal. A duty ratio of the square wave signal corresponds to a duty ratio of a texture of the body feeling, so it is able to simulate a body feeling for the texture of the button.

The present disclosure further provides in some embodiments an unlocking control device for an electronic apparatus, which includes: an obtaining module configured to obtain an unlocking touch input; an excitation module configured to, in the case that a retention time of the unlocking touch input at any one of a plurality of target positions is greater than a predetermined time threshold, generate at least one vibration excitation in accordance with the retention time; and an unlocking module configured to, in the case that an unlocking control signal determined in accordance with the unlocking touch input matches a predetermined unlocking password, control the electronic apparatus to be unlocked. The unlocking control signal includes a touch sequence of the unlocking touch input with respect to the plurality of target positions and the quantity of vibration excitations generated at each target position.

In a possible embodiment of the present disclosure, the electronic apparatus includes a touch region. The unlocking control device further includes: a distance detection module configured to obtain a distance between a touch point of the unlocking touch input and each target position; a first driving module configured to, in the case that the distance between the touch point and each target position is greater than a first distance threshold, drive the touch region to vibrate in a first mode; a second driving module configured to, in the case that the distance between the touch point and at least one of the target positions is less than or equal to the first distance threshold and the distance between the touch point and any of the target positions is greater than a second distance threshold, drive the touch region to vibrate in a second mode; and a third driving module configured to, in the case that there is a target position whose distance from the touch point is less than or equal to the second distance threshold, drive the touch region to vibrate in a third mode. The first distance threshold is greater than the second distance threshold, and the first mode, the second mode, and the third mode are different from each other.

In a possible embodiment of the present disclosure, the electronic apparatus includes a plurality of piezoelectric assemblies surrounding the touch region. The unlocking control device further includes: a touch movement direction obtaining module configured to obtain a touch movement direction corresponding to the unlocking touch input; and a target piezoelectric assembly determination module configured to determine a target piezoelectric assembly that drives the touch region to vibrate in accordance with the touch movement direction. A distance between the target piezoelectric assembly and a straight line where the touch movement direction is arranged is less than a fourth distance threshold.

In a possible embodiment of the present disclosure, the first driving module is configured to drive the touch region to vibrate through the piezoelectric assembly with a first carrier signal carrying a first modulation signal, and/or drive the touch region to vibrate through the piezoelectric assembly with the first carrier signal.

In a possible embodiment of the present disclosure, the electronic apparatus further includes a linear motor, and the third driving module is specifically configured to drive the touch region to vibrate through the linear motor with a second carrier signal. A frequency of the second carrier signal is less than a frequency of the first carrier signal.

In a possible embodiment of the present disclosure, the third driving module is configured to drive the touch region to vibrate through the piezoelectric assembly with a first carrier signal carrying a second modulation signal. The second modulation signal is different from the first modulation signal.

In a possible embodiment of the present disclosure, the second modulation signal is a square wave signal.

The unlocking control device in the embodiments of the present disclosure is capable of implementing the steps in the above-mentioned unlocking control method with a same or similar technical effect, which will not be particularly defined herein.

The present disclosure further provides in some embodiments an electronic apparatus, including a processor, a memory, and a computer program stored in the memory and executed by the processor. The computer program is executed by the processor so as to implement the steps in the above-mentioned unlocking control method with a same technical effect, which will not be particularly defined herein.

The present disclosure further provides in some embodiments a computer-readable storage medium storing therein a computer program, and the computer program is executed by a processor so as to implement the steps in the above-mentioned unlocking control method with a same technical effect, which will not be particularly defined herein. The computer-readable storage medium includes a read-only memory (ROM), a random access memory (RAM), a magnetic disk or an optical disk.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), an ROM, an RAM, a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An unlocking control method for an electronic apparatus, comprising:
   obtaining an unlocking touch input;
   in the case that a retention time of the unlocking touch input at any one of a plurality of target positions is greater than a predetermined time threshold, generating at least one vibration excitation in accordance with the retention time, wherein the target positions comprise positions corresponding to the unlocking password and other positions having an input response; and
   in the case that an unlocking control signal determined in accordance with the unlocking touch input matches a predetermined unlocking password, controlling the electronic apparatus to be unlocked,
   wherein the unlocking control signal comprises a touch sequence of the unlocking touch input with respect to the plurality of target positions and the quantity of vibration excitations generated at each target position;
   wherein the electronic apparatus comprises a plurality of piezoelectric assemblies, and the generating at least one vibration excitation in accordance with the retention time comprises driving at least one of the plurality of piezoelectric assemblies to generate the at least one vibration excitation;
   wherein the electronic apparatus comprises a touch region,
   wherein subsequent to obtaining the unlocking touch input, the unlocking control method further comprises:
   obtaining a distance between a touch point of the unlocking touch input and each target position;
   in the case that the distance between the touch point and each target position is greater than a first distance threshold, driving the touch region to vibrate in a first mode;
   in the case that the distance between the touch point and at least one of the target positions is less than or equal to the first distance threshold and the distance between the touch point and any of the target positions is greater than a second distance threshold, driving the touch region to vibrate in a second mode; and
   in the case that there is a target position whose distance from the touch point is less than or equal to the second distance threshold, driving the touch region to vibrate in a third mode,
   wherein the first distance threshold is greater than the second distance threshold, and the first mode, the second mode, and the third mode are different from each other;
   wherein the electronic apparatus comprises a plurality of piezoelectric assemblies surrounding the touch region, and subsequent to obtaining the unlocking touch input, the unlocking control method further comprises: obtaining a touch movement direction corresponding to the unlocking touch input; and determining a target piezoelectric assembly that drives the touch region to vibrate in accordance with the touch movement direction, wherein a distance between the target piezoelectric assembly and a straight line where the touch movement direction is arranged is less than a fourth distance threshold.

2. The unlocking control method according to claim 1, wherein the driving the touch region to vibrate in the first mode comprises driving the touch region to vibrate through the piezoelectric assembly with a first carrier signal carrying a first modulation signal; and/or the driving the touch region to vibrate in the second mode comprises driving the touch region to vibrate through the piezoelectric assembly with the first carrier signal.

3. The unlocking control method according to claim 2, wherein the electronic apparatus further comprises a linear motor, and the driving the touch region to vibrate in the third mode comprises driving the touch region to vibrate through the linear motor with a second carrier signal, wherein a frequency of the second carrier signal is less than a frequency of the first carrier signal.

4. The unlocking control method according to claim 2, wherein the driving the touch region to vibrate in the third mode further comprises driving the touch region to vibrate through the piezoelectric assembly with a first carrier signal carrying a second modulation signal, wherein the second modulation signal is different from the first modulation signal.

5. The unlocking control method according to claim 4, wherein the second modulation signal is a square wave signal.

6. An unlocking control device for an electronic apparatus, comprising a processor and a memory, wherein the memory is configured to store a computer program, and the processor is configured to call the computer program so as to implement:
 obtaining an unlocking touch input;
 in the case that a retention time of the unlocking touch input at any one of a plurality of target positions is greater than a predetermined time threshold, generating at least one vibration excitation in accordance with the retention time, wherein the target positions comprise positions corresponding to the unlocking password and other positions having an input response; and
 in the case that an unlocking control signal determined in accordance with the unlocking touch input matches a predetermined unlocking password, controlling the electronic apparatus to be unlocked,
 wherein the unlocking control signal comprises a touch sequence of the unlocking touch input with respect to the plurality of target positions and the quantity of vibration excitations generated at each target position;
 wherein the electronic apparatus comprises a plurality of piezoelectric assemblies, and the generating at least one vibration excitation in accordance with the retention time comprises driving at least one of the plurality of piezoelectric assemblies to generate the at least one vibration excitation;
 wherein the electronic apparatus comprises a touch region,
 wherein subsequent to obtaining the unlocking touch input, the unlocking control method further comprises:
 obtaining a distance between a touch point of the unlocking touch input and each target position;
 in the case that the distance between the touch point and each target position is greater than a first distance threshold, driving the touch region to vibrate in a first mode;
 in the case that the distance between the touch point and at least one of the target positions is less than or equal to the first distance threshold and the distance between the touch point and any of the target positions is greater than a second distance threshold, driving the touch region to vibrate in a second mode; and
 in the case that there is a target position whose distance from the touch point is less than or equal to the second distance threshold, driving the touch region to vibrate in a third mode,
 wherein the first distance threshold is greater than the second distance threshold, and the first mode, the second mode, and the third mode are different from each other;
 wherein the electronic apparatus comprises a plurality of piezoelectric assemblies surrounding the touch region, and subsequent to obtaining the unlocking touch input, the unlocking control method further comprises: obtaining a touch movement direction corresponding to the unlocking touch input; and determining a target piezoelectric assembly that drives the touch region to vibrate in accordance with the touch movement direction, wherein a distance between the target piezoelectric assembly and a straight line where the touch movement direction is arranged is less than a fourth distance threshold.

7. An electronic apparatus, comprising a processor, a memory, and a computer program stored in the memory and executed by the processor, wherein the computer program is executed by the processor so as to implement the steps in the unlocking control method according to claim 1.

8. A non-transitory computer-readable storage medium storing therein a computer program, wherein the computer program is executed by a processor so as to implement the steps in the unlocking control method according to claim 1.

9. The unlocking control method according to claim 3, wherein the driving the touch region to vibrate in the third mode further comprises driving the touch region to vibrate through the piezoelectric assembly with a first carrier signal carrying a second modulation signal, wherein the second modulation signal is different from the first modulation signal.

* * * * *